United States Patent [19]

Uchida et al.

[11] 4,117,586
[45] Oct. 3, 1978

[54] MACHINE TOOL WITH AUTOMATIC TOOL CHANGER

[75] Inventors: Yoshiro Uchida; Toshihiko Mizuno; Isao Higuchi; Susumu Imai; Shyoichiro Usui, all of Abiko, Japan

[73] Assignee: Hitachi Seiki Co., Ltd., Tokyo, Japan

[21] Appl. No.: 675,897

[22] Filed: Apr. 12, 1976

[51] Int. Cl.² .......................................... B23Q 3/157
[52] U.S. Cl. ..................................... 29/568; 90/11 D
[58] Field of Search ............... 29/26 A, 568; 90/11 A, 90/11 D; 279/1 A, 1 TS, 102, 103; 294/106; 214/1 BB, 1 BC, 1 BD; 211/1.5

[56] References Cited

U.S. PATENT DOCUMENTS

| Re. 25,737 | 3/1965 | Braihocol et al. | 29/568 |
| 3,152,811 | 10/1964 | Perrin | 90/11 D |
| 3,443,309 | 5/1969 | Muller et al. | 29/568 |
| 3,791,022 | 2/1974 | Kurimoto et al. | 29/568 |

FOREIGN PATENT DOCUMENTS 927,223  5/1963  United Kingdom ................. 90/11 A

*Primary Examiner*—Gil Weidenfeld
*Attorney, Agent, or Firm*—Wenderoth, Lind & Ponack

[57] ABSTRACT

A machine tool with an automatic tool changer having a tool storage magazine accommodating tools having the same shank configuration as that of the first shank, tools having the same configuration as that of the second shank, and a tool adaptor which has the same configuration as the larger of the first shank or second shank and which incorporate the smaller shank sections of the tools of the first shank or second shank configuration.

4 Claims, 36 Drawing Figures

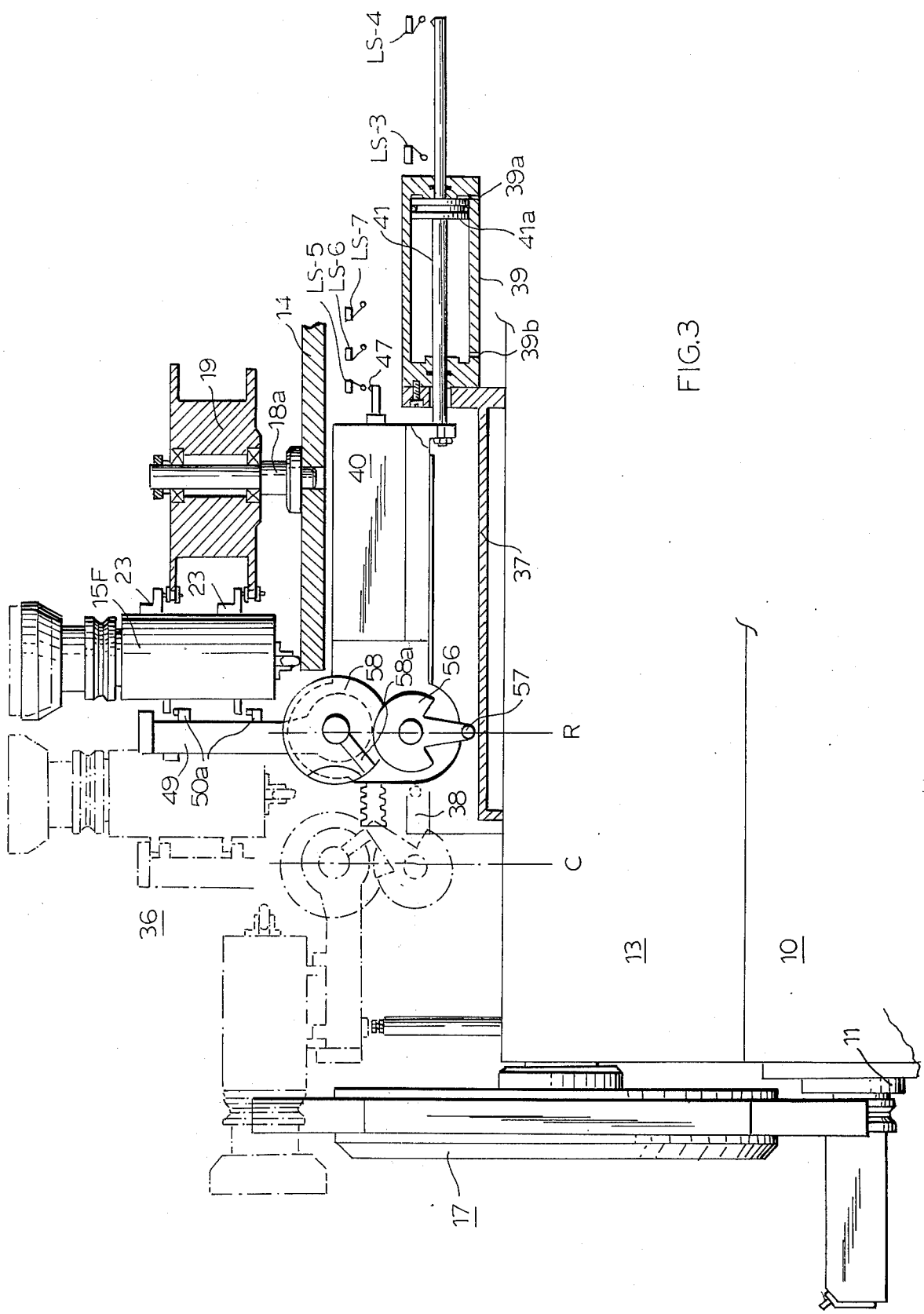

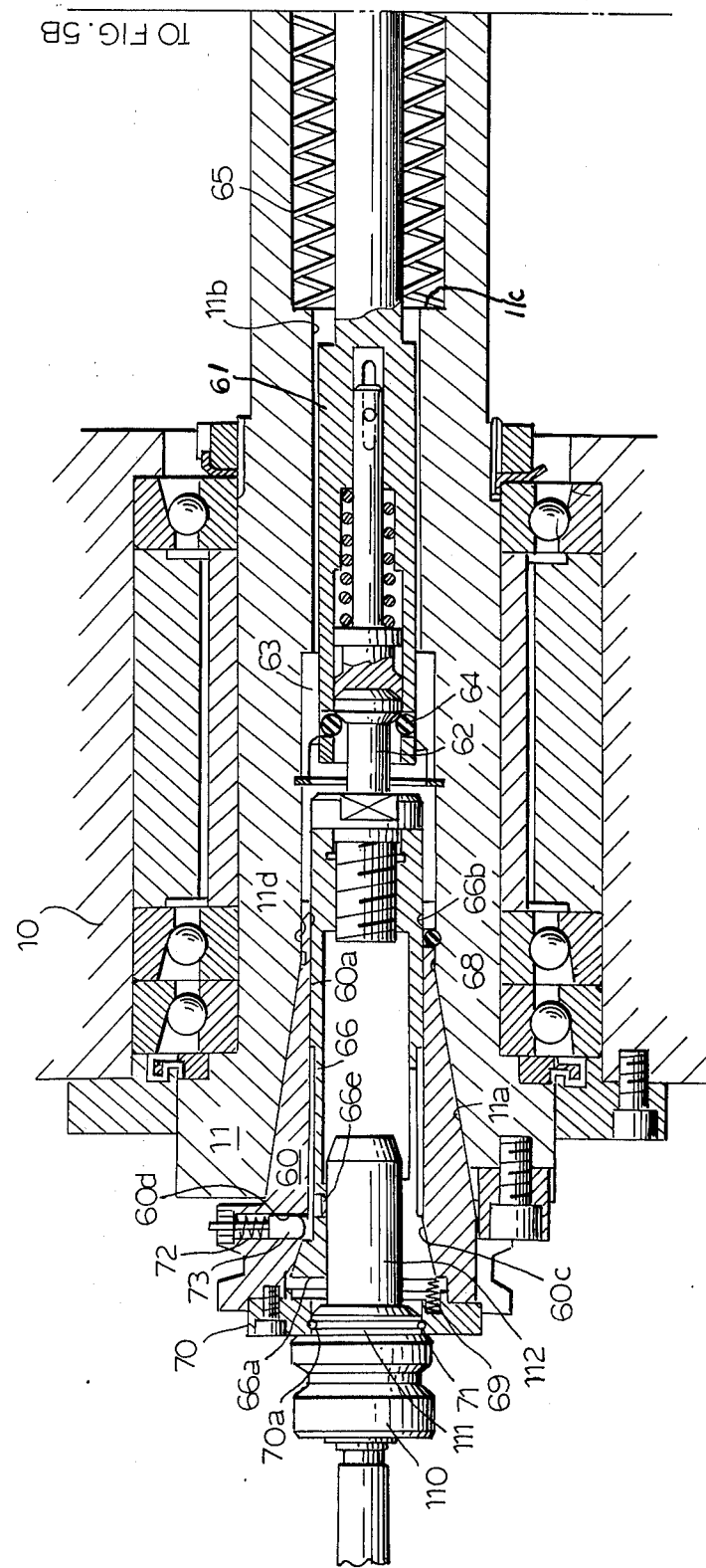

MACHINE TOOL WITH AUTOMATIC TOOL CHANGER

BACKGROUND OF THE INVENTION

The present invention is designed to effect improvement of a machine tool with an automatic tool changer.

A variety of automatic tool changer have been developed in the past. When attention is focused on the tool change time, the most effective result is assured by the type of automatic tool changer featuring a so-called "integrated" spindle head construction in which the spindle head supporting the tool spindle is integrally built with the tool storage magazine and tool change arm.

However, an automatic tool changer of this type has a disadvantage in that the number of the tools which can be contained in the tool storage magazine is limited. This is because of (1) limited space in the spindle head, (2) the need to mount large-diameter tools (full-back cutter, boring tool, etc.) in the storage magazine to fulfill the purpose of the machine tool with an automatic tool changer to complete all the machining operations in a single setup, and (3) the need to return the used tool into the next tool socket since the tool change arm generally uses a twin arm system which permits simultaneous change of the new and old tools. Therefore, when determining the tool layout in the tool storage magazine, the same pitches should be used for tool arrangement, with the large-diameter tool taken into consideration. This leads to a reduction in the number of tools which can be stored in the magazine.

OBJECTS AND SUMMARY OF THE INVENTION

The primary purpose of the present invention is to offer to the industry concerned a machine tool with an automatic tool changer permitting storage of the maximum number of tools by arranging tools with two types of shank configurations in the tool storage magazine through the use of a small-diameter tool holding adaptor provided with a large-diameter tool shank.

The second purpose of the present invention is to offer a machine tool with an automatic tool changer with a variable pitch tool storage magazine, in which large-diameter tools (full-back cutter, boring tool, etc.) with national taper shanks, small-diameter tools (drill, tap, reamer, etc.) with straight shanks and adaptors with national taper shanks for making possible insertion of the straight shank tool into the spindle socket, are provided at the minimum intervals so that they will not interfere with each other. This is to assist the accomplishment of the primary purpose.

The third purpose of the present invention is to offer a small-diameter tool holding adaptor which permits insertion of a small-diameter tool shank into a spindle socket with the same configuration as that for a large-diameter tool shank. This is to increase the number of tools which can be stored in the magazine by arranging the large-diameter tools and small-diameter tools with different shank configurations in such a way that they will not interfere with one another. In other words, the third purpose of this invention, in a machine tool with a spindle construction which permits incorporation of a tapered shank section of a large-diameter tool and which is provided with a tool clamping rod to clamp a large-diameter tool by pulling it into the tool socket through engagement with a pull stud at the rear of said large-diameter tool, is to offer a machine tool which permits mounting of large-diameter or small-diameter tools on one and the same spindle without any modification of the spindle construction by means of a small-diameter tool holding adaptor comprising an adaptor which has a shank configuration the same as that of the tapered shank of the said large-diameter tool and which can be mounted in the tool socket on the front of the spindle, a tool holding member which is mounted in the said adaptor to move in the axial direction thereof and which is designed to hold the shank section of the small-diameter tool inserted into the adaptor by the axial movement, and a pull stud which is installed on the rear of the said tool holding member protruding from the adaptor and which is engaged with the said tool clamping rod.

The fourth purpose of this invention is concerned with improving the tool change arm of the machine tool for the transfer of tools between the magazine storing a large number of tools and the tool spindle, between the tool storage magazine and an intermediate transfer unit or between the intermediate transfer unit and the tool spindle. Especially, the fourth purpose seeks to offer a tool change arm which changes the tool by holding the different tool flanges of large- and small-diameter tools.

Recently, there has been an increasing tendency to use on the production line a group control system to provide integrated control of diversified types of machine tools by means of computers. To reduce the number of tools and to assure effective use of the tools and reduction of the maintenance cost, a proposal has been made to use common tools for different types of machines. When the dimensions of the tool flange section differ according to the machine tools, the conventional tool change arm is of little use in this production line. As illustrated in the examples of the present invention, such a tool change arm is necessary when the said production line is to include a machine tool with an automatic tool changer where the spindle end has a configuration to incorporate large-diameter tools and small-diameter tools by means of an adaptor.

The fifth purpose of the present invention is to offer a tool transfer arm which permits transfer of tools with different tool flange sections by holding them concentrically in a simplified construction through the provision of a small-diameter holding section with the same diameter as that of the small diameter tool flange section and a large-diameter tool holding section with the same diameter as that of the large-diameter tool flange section and formed concentrically with the said small-diameter tool holding section on the tool holding section of a pair of tool holding jaws provided to fulfill the fourth purpose.

The sixth purpose of this invention is to offer a device which permits control of the tool transfer arm to transfer the tool to the tool holding position according to the particular tool requirements through stepless control of the operation of axial movement drive source for the tool transfer arm described in connection with the fourth purpose and through the provision of a control device to provide stepped control of the tool transfer arm to the large-diameter tool holding position and small-diameter tool holding position and to the position where the tool is pulled out. This is especially effective when the small-diameter tool holding adaptor having the same configuration of the shank as that of the large-diameter tool, as illustrated in the examples of using the present invention. This is because there is a difference between the small-diameter tool flange position and large-diameter tool flange position.

The seventh purpose of the present invention is concerned with the improvement of the tool clamping device of the machine tool and seeks to offer a tool clamping device to permit selective clamping and unclamping of the large- and small-diameter tools in the machine tool with a configuration of the spindle end which incorporates both the large-diameter tool and small-diameter tool with different shank configurations through the adaptor.

In other words, the seventh purpose of the invention is to offer a tool clamping device to permit mounting of a large- or small-diameter tool on one and the same spindle through the provision of the tool with a tool socket spindle which permits mounting of a large-diameter tool and an adaptor which has the same configuration as that of the shank section of the said large-diameter tool and which can hold the small-diameter tool shank section with a different shank configuration from that of the large-diameter tool, a tool clamping rod which clamps the large- or small-diameter tool mounted on the said tool socket by pulling it in the axial direction, a power source which moves the said tool clamping rod in the axial direction, and a control device which controls the travel distance of the said tool clamping rod through selective control of the said drive force according to the size of the tool (large- or small-diameter) inserted into the said tool socket.

BRIEF DESCRIPTION OF THE DRAWINGS

The present invention will be described with reference to the attached drawings, which illustrate one example of the machine tool with an automatic tool changer according to the present invention and in which:

FIG. 3 is a partial sectional view for showing the tilting action of the tool socket;

FIGS. 5A and 5B are parts of a longitudinal section of the spindle with a tool inserted into the tool spindle;

DETAILED DESCRIPTION OF THE INVENTION

Figure 1A:
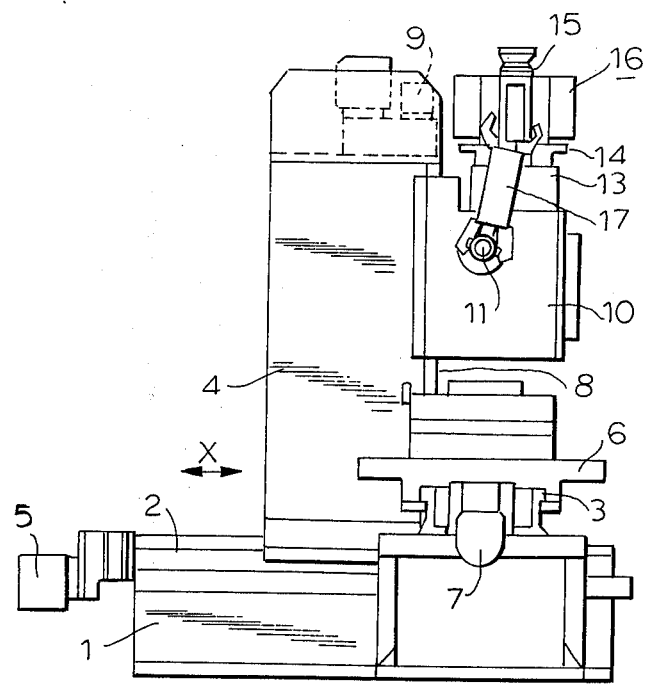
FIG. 1A is a general front elevation view of the machine tool with an automatic tool changer.
Figure 1B:
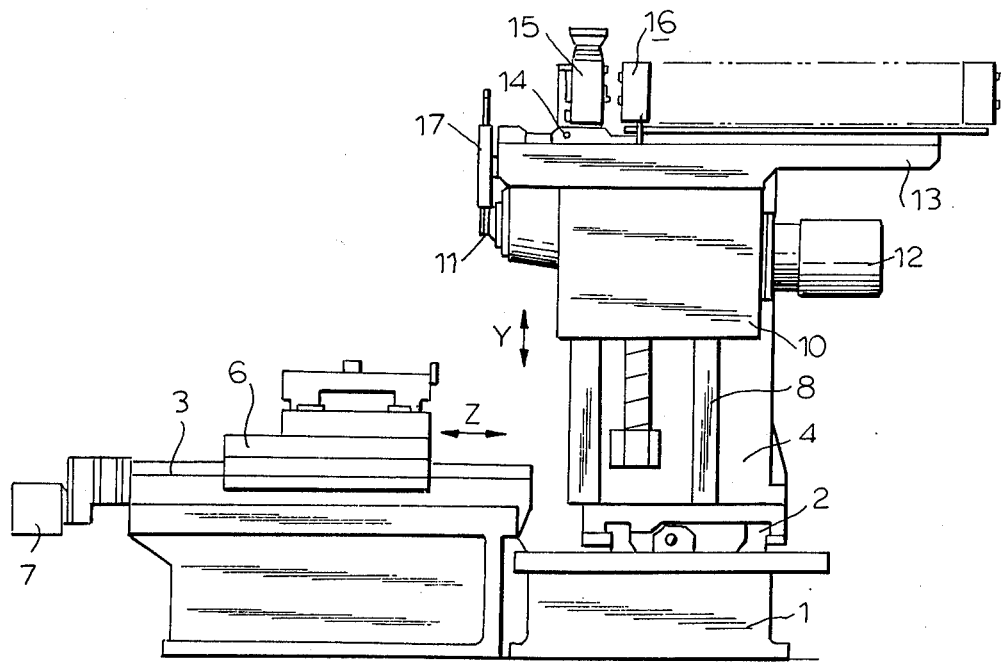
FIG. 1(B) is a side view of the machine of FIG. 1.

Before giving a detailed description of this invention, there will be given an outline of the structure of the machine tool with the automatic tool changer with which the present invention is concerned, with reference to FIGS. 1(A) and 1(B).

The machine tool has a T-formed base 1 on which a column guideway 2 and table guideway 3 are provided. Column 4 moves freely on the said column guideway 2 in the X-axis direction and the said column 4 is driven by the known drive system of a motor 5 and a ball screw and nut. The table 6 moves freely on the table guideway 3 in the Z-axis direction and is driven by the known drive system of motor 7 and a ball screw and nut.

The side of the said column 4 is provided with a spindle head guideway 8, and spindle head 10 moves freely on the said guideway 8 in the Y-axis direction. The said spindle head 10 is driven by the known drive system of motor 9 and a ball screw and nut. The tool spindle 11 swivels freely on the said spindle head 10 and is driven by a motor 12 and a drive system through a speed change gear inside the spindle head.

Tool changer 13 is mounted on spindle head 10 and magazine base 14 is mounted on the said tool changer 13. A tool socket is mounted on magazine base 14 and can be mounted or dismounted as required. A chain type tool storage magazine 16 can be operated to drive the chain thereof as desired. Therefore, when the next tool is called for, the desired tool socket is removed from the chain at the specified position and is advanced to the tool change ready position, where the tool socket waits until the machining complete command is given. Upon receiving this command, the tool socket tilts at that position and is positioned parallel to the spindle. Then the tool is changed.

The said tool changer 13 is provided with a tool change arm 17 which can be moved in the axial direction and swivelled as desired. This arm serves to replace the tool of the said tool spindle 11 with the tool waiting in the tool socket.

There will now be described the details of the tool storage magazine as shown in FIG. 2(A), FIG. 2(B), FIG. 3 and FIG. 4.

The surface of the magazine base 14 is provided with two columns 18a and 18b in the vertical position. Column 18a which is at the spindle top end position has an idler chain wheel 19 rotatably mounted thereon while the column 18b has a drive chain wheel 20 rotatably mounted thereon. These wheels are mounted on respective bearings and can be rotated as required. Chains 21 extend around the upper and lower portions of the chain wheels 19 and 20 in a loop and carry a number of tool sockets 15 on the periphery thereof. The tool sockets 15 have hook dogs 23 mounted on the sides thereof which are freely engageable on pins 22 on the tops of the chains. The tool sockets can be mounted on and removed from the chains as required. The bottom of each tool socket 15 is provided with a roller 15r which rolls on magazine base 14 to support the weight of the tool socket 15.

The tool sockets are of two types according to the configuration of the tool sockets; types 15f and 15b having a recess into which the national taper shank tool can be inserted and type 15d having a recess into which the straight shank tool can be inserted. To prevent tool from jumping out when the tool socket is tilted, the national taper shank sockets 15f and 15b have a spring 15s therein to engage and hold the head of the pull stud 62, while the straight shank socket 15d has a spring 71 at the open end of the tool socket engageable in a groove in the tool flange to hold the straight shank tool.

In mounting these tool sockets 15 on the chains, three types of sockets are used depending on the interval between the adjacent sockets.

That is, sockets 15f are spaced with three chain links between adjacent tool sockets, and are used for large-diameter tools (fullback cutter, etc.). Sockets 15b are spaced with two chain links between adjacent tool sockets and are used for intermediate-diameter tools (boring tool, etc.). There is only one chain link between adjacent sockets 15f, and they are used for small-diameter tools (drill, tap, reamer, etc.).

Thus, since the tool sockets are arranged at an unequal pitch with respect to chain 21, the tool sockets and their respective tools have a definite correspondence in a tool storage magazine of the so-called fixed address type system.

Figure 2A:
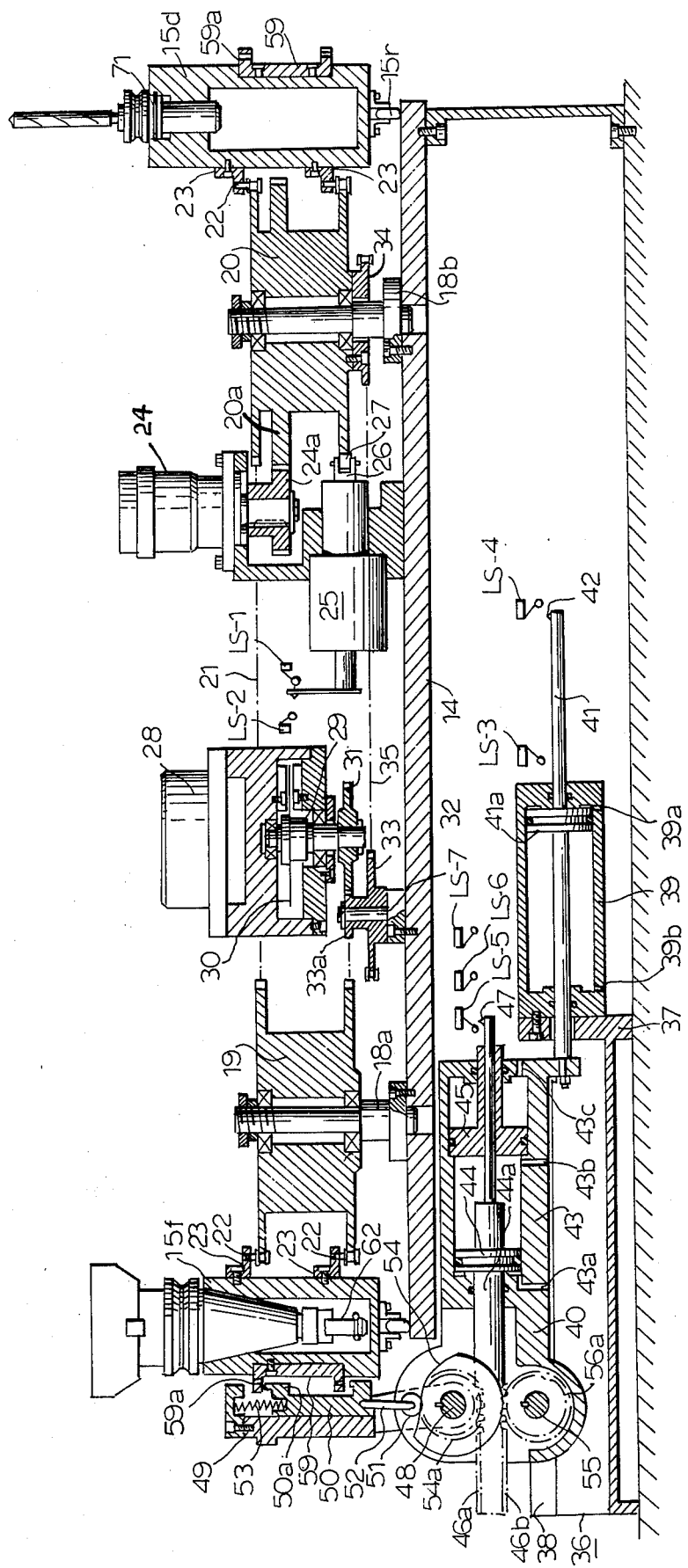
FIG. 2A is a longitudinal section of the tool storage magazine.
Figure 2B:
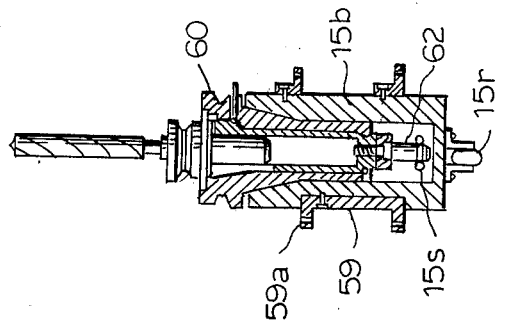
FIG. 2(B) is a longitudinal section of a tool socket inserted into an adaptor.

As illustrated in FIG. 2(B), adapter 60 is inserted into the tool socket 15b together with the intermediate-diameter tool carried therein. The straight shank of the intermediate diameter tool is inserted into the adapter 60 and is maintained in such a way that the height of the tool flange section of adapter 60 is different from that of the tool flange section of the straight shank.

As is clear from the above description, the dimension of the tool sockets 15f and 15b perpendicular to the chains 21 is different from that of the tool sockets 15d and these dimensions are in accordance with the tool to be inserted in the respective socket.

A drive source 24 is mounted on the top of the magazine base 14 and on the left side of the drive chain wheel 20 and serves to rotate the drive chain wheel 20 through the gear 24A mounted on the output shaft end of the said drive source 24 and gear portion 20A at the center of the drive chain wheel 20. As a result, chains 21 are drive along the loop in which they extend around chain wheels 19 and 20. The said drive source 24 is operated by the call instruction for the tool to be used in the next cycle in the tape control mode.

The central top portion of the magazine base 14 is provided with an identifier unit 28 to identify the position of the tool socket 15 mounted on the unequal pitch. The identifier unit 28 is equipped with a shaft 29 which can be rotated as required. The lower end of the shaft 29 has mounted thereon a gear 31 and code plate 30 having codes which correspond to the positions of the tool sockets is mounted at the upper end of shaft 29.

The gear 31 meshes with a gear 33a on a sprocket wheel 33 freely rotatably mounted on a shaft 32 on the surface of the magazine base 14. A sprocket wheel 34 on the lower end of the drive chain wheel 20 is connected to the said geared sprocket wheel 33 through a chain 35. Therefore, when the chain 21 is driven by rotation of the drive sprocket wheel 20, the code plate 30 also rotates. In this embodiment, one rotation of the chain is synchronized with one rotation of the code plate 30. The lower end of the support for the said drive power source 24 has a double acting hydraulic cylinder 25 mounted thereon to index the chain 21. Piston rod 26 is advanced or retracted by hydraulic pressure in said cylinder 25. The chain 21 is indexed by engagement of the roller 27 at the outer end of the piston rod with the lower portion of the drive chain wheel 20.

The tape instructions operates the drive source 24 and identifies the number on the code plate 30 corresponding to the tool socket for the tool which is to be used for the next operation. When the tool socket thus identified comes to the call position, the drive source 24 is stopped and the indexing cylinder 25 is operated. The roller 27 of the piston rod 26 is thereby meshed with the lower portion of the drive chain wheel 20, thereby indexing the loop-formed chain 21.

The tool transfer device 36 is positioned to the left of the spindle top end of the chain type magazine 16 between the tool changer 13 and magazine base 14. The top of the carrier base 37 of the said tool transfer device 36 is provided with a guideway 38 parallel to the spindle centerline. A double acting hydraulic cylinder 39 is mounted on the back of the carrier base 37, parallel with the guideway 38. Carrier 40 is freely slidably mounted on the said guideway 38. The rear end of the said carrier 40 is connected with one end of the piston rod 41 which reciprocates inside the said cylinder 39. By switching the hydraulic pressure to the cylinder 39, the carrier 40 shown in FIG. 3 can be reciprocated between the socket call position R and tool change ready position C (see FIG. 3).

Movements to these positions are confirmed when the dog 42 mounted on the piston rod 41 has actuated the limit switch LS-3 or LS-4.

The carrier 40 is provided with a hydraulic positioning cylinder 43, which, in turn, is equipped with double acting pistons 44 and 45 moving as required. Both the upper and lower sides of piston rod 44a integral with the piston 44 are provided with racks 46a and 46b. The rear end of the piston rod 44a is slidable within the said piston 45. A dog 47 is mounted on the rear end of the piston rod 44a and is used to indicate the position of piston rod 44a at one of three positions by actuating the limit switches LS-5, LS-6 and LS-7 mounted to the rear of the cylinder 43.

The carrier 40 is provided with a cradle arm 49 which is mounted on a first shaft 48 extending in a direction transverse to the spindle centerline and which is cradled on the shaft 48. A socket engage/disengage piece 50 is mounted on the side of the said arm 49 and for movement therealong in the vertical direction. A rod 52 is mounted on the lower end of piece 50 and has a roller 51 on the lower end thereof.

The roller 51 is held in contact with the surface of a socket engage/disengage cam 54 keyed to the shaft 48 and having a toothed portion 54a, by means of a spring 53 pushing the socket engage/disengage piece 50 downward at all times.

The toothed portion 54a of the said cam 54 is engaged with the rack 46a on the top of the piston rod 99a. The rack 46b on the bottom of the piston rod 44a is engaged with a toothed portion 56a of a Geneva gear drive plate 56 keyed on a second shaft 55 extending in a direction transverse to the spindle centerline.

A pin 57 on the said drive plate 56 meshes with the cam groove 58a in Geneva gear driven plate 58 on the said cradle arm 49. Therefore, when the hydraulic pressure is fed to the ports 43a and 43c of the cylinder 43 with the parts in the positions shown in FIG. 2(A) and the pressure fluid is drained through port 43b, the piston 44 moves to the right until it hits the piston 45.

This movement rotates the gears 54a and 56a meshing with the racks 46a and 46b on the piston rod 44a. Gear 54a moves the socket engage/disengage piece 50 upward by means of the cam 54, roller 51 and rod 52. Then the pins 50a on the engage/disengage piece 50 are inserted into the holes 59a of the hook dog 59 on the tool socket 15 at the call position of the chain type magazine to lift the tool socket 15 and to remove the hook dogs 23 from the pins 22 on the chains 21.

Gear 56a and Geneva pin 57 of the Geneva drive plate 56 rotate simultaneous with the above operation. Rotation of tie pin 57 ends at the position when it moves into the Geneva cam groove 58a. Completion of this operation is confirmed when the dog 47 on the piston rod 44a has actuated the limit switch (LS-6). The confirmation signal from this limit switch (LS-6) is used to control the flow of hydraulic fluid to direct it into the port 39a of the cylinder 39, and the carrier 40 advances to the tool change ready position (C) by the movement of the piston 41a and piston rod 41. Completion of this operation is confirmed when the dog 42 has actuated the limit switch (LS-3). With the parts in these positions, the carrier waits with the tool socket 15 in the upright position until the machining is completed, preventing the waiting tool from interfering with the piece being machined. When the machining completion signal has been given as a result of which the hydraulic pressure fluid is fed to the port 43a of the cylinder 43 and the exhaust pressure fluid flows out of the ports 43b and 43c, piston 44 moves to the right together with the piston 45. This movement rotates the rack 46b under the piston rod 44a. Gear 56a rotates the Geneva drive plate 56 and the Geneva driven plate 58 through pin 57 of the said drive plate 56. It further rotates the cradle arm 49 90° in the counterclockwise direction and moves the tool socket 15 parallel to the spindle centerline. The socket is thus tilted to the position where the tools can be changed by means of the tool change arm.

At the same time, the gear 54a rotates. Since the roller 51 is located at the maximum lift position of the cam 54 through the previous rotation of cam 54, the socket engage-disengage piece 50 is maintained in the lifted position.

Completion of this operation is confirmed when the dog 47 actuates the limit switch (LS-7). This signal is used to start the operation of the tool change arm 17. After the signal indicating the end of the operation of the tool change arm 17 has been produced, the foregoing operation is performed in the reverse sequence to return the used tool to the original address in the tool storage magazine.

Figure 5C:
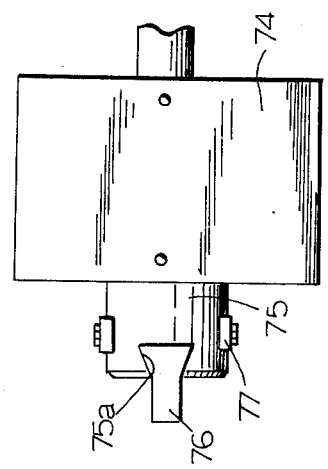
FIG. 5C is a plan view from the direction of arrow A in FIG. 5B.
Figure 5B:
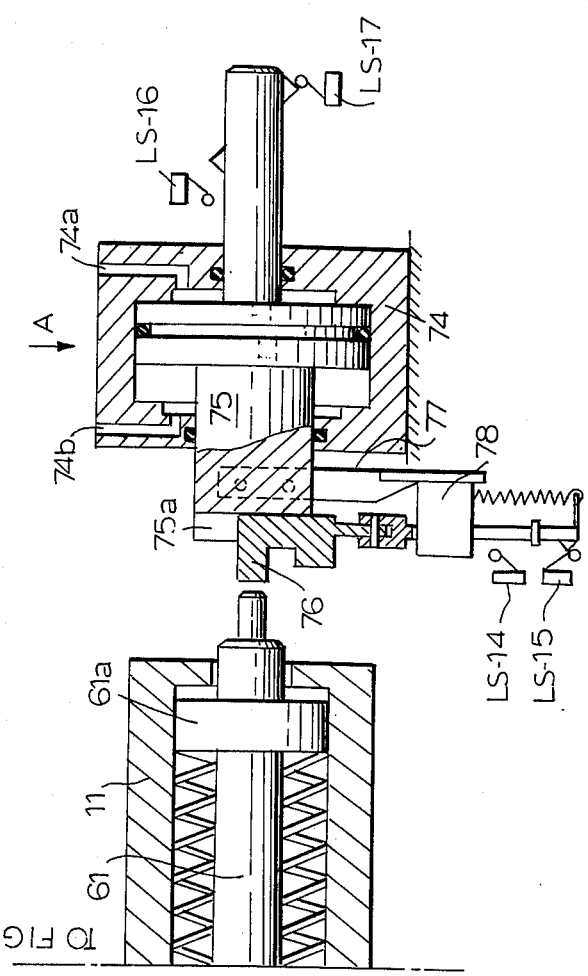
Figure 4:
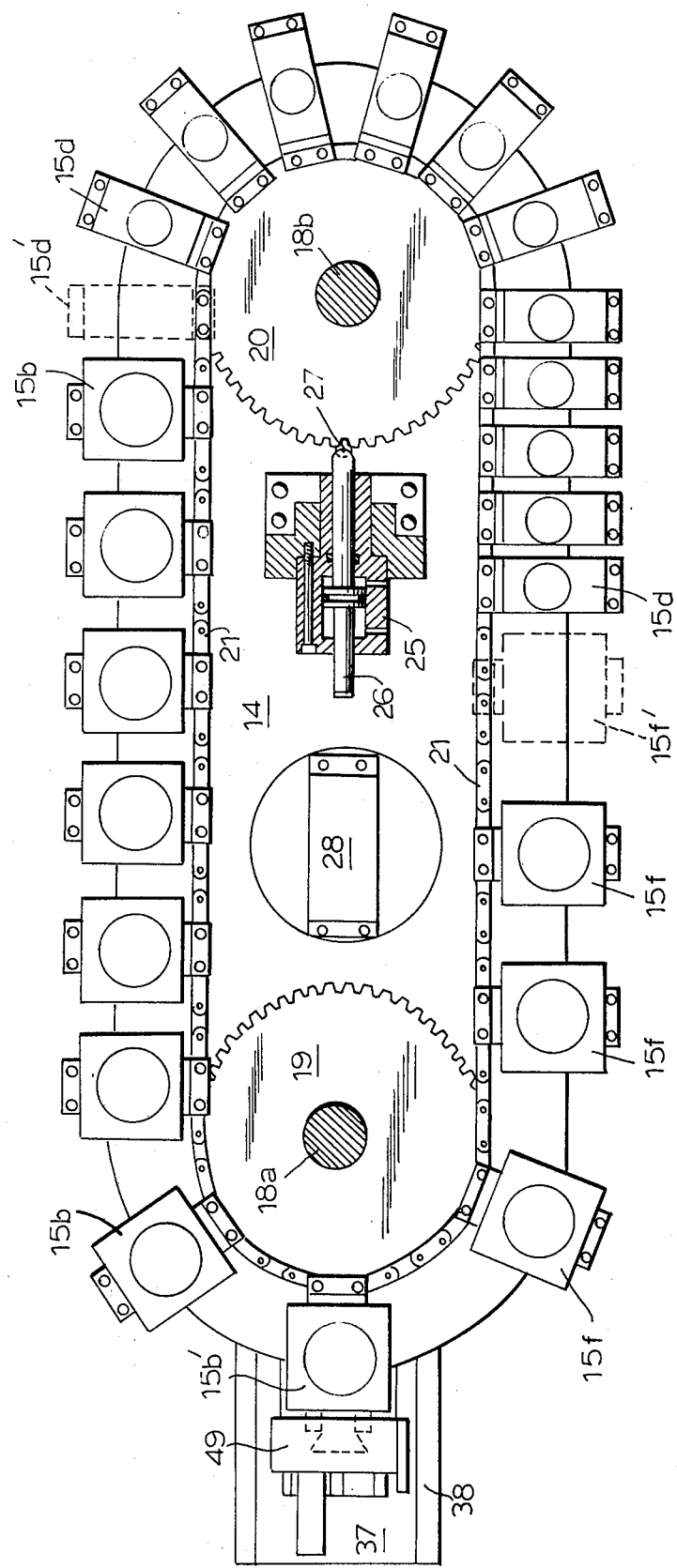
FIG. 4 is a plan view of the tool storage magazine.

As illustrated in FIGS. 5A – 5C, a tool spindle 11 is mounted on the spindle head 10 in bearings and can be rotated as required. The tool spindle 11 is provided with a bore 11b from the tool seat 11a at the front end to the rear of the spindle. The bore 11b has a tool clamping device therein. The said bore 11b is provided with a tool clamping rod 61 which is movable in the axial direction of the spindle. The outer or tool carrying end of the said clamping rod 61 has a collet chuck for engaging the pull stud of a tool adapter and which is actuated by means of a collet cam 63 mounted in the bore 11b and balls 64 on the outer end of the clamping rod 61 which are operated by the said collet cam 63, in order to grasp the pull stud of the tool or tool adapter inserted into the tool seat 11a. Several belleville springs 65 for tool clamping are mounted between the shoulder 11c of the spindle bore 11b and the flange 61a on the rear of the clamping rod 61. These springs pull the tool inside the spindle by the reaction force of the said springs 65. The tool seat 11a at the tool receiving end of the spindle can directly receive an ordinary national taper shank tool or an adapter 60 which has a national taper shank (as illustrated in FIG. 5A) and which includes a collet chuck for holding a straight shank tool. Accordingly, a straight shank tool can also be mounted on the spindle through the adapter 60. The adapter 60 is provided with an axial hold 60a and is also provided with a collet chuck 66 to hold the straight shank of the small-diameter tool.

The conical surface on on the collet 66a of the collet chuck 66 contacts the conical cam surface 60c inside the adapter 60 and is closed when the said collet chuck 66 is drawn into the tool spindle. It is opened when the collet chuck is pushed forward. The rear portion of the collet chuck is pushed forward. The rear portion of the collet chuck is provided with a pull stud 62. When the adapter 60 is inserted into the tool seat 11a of the spindle, the said pull stud 62 is placed in a position to be engaged with a collet chuck for the said pull stud 62. A hole of the cylindrical section on the rear of the adapter 60 holds a ball 68 so that it is movable freely in a radial direction and is engageable with either the groove 66b on the periphery of the collet chuck 66 or the groove 11d on the inside of the spindle. A ring cover 70 is mounted on the front of the adapter 60 and ring spring 71 is positioned in an internal groove of the said cover 70. When the shank section of the small-diameter tool 110 is inserted into the adapter 60, the said ring spring 71 snaps into the groove 111 in the said shank section, thereby maintaining the small-diameter tool in the adapter 60. A spring 69 is provided between the said cover 70 and the front of the collet 66a. It pushes the collet chuck 66 backward, i.e., into the adapter, at all times to prevent play between the collet chuck 66 and the adapter 60. The flange section of the adapter 60A is provided with a hold 60d which leads from the periphery to the hole 60a. A rod 73 is inserted into the said hole 60d through the spring 72. Since adapter 60 is inserted into the spindle in FIG. 5(A), rod 73 is pressed against the periphery of the collet inside the hole 60a by means of the spring 72.

A positioning hole 66c is provided in the periphery of the collet corresponding to the tip of the rod 73 in such a way that the collet chuck will be maintained at the position where the ball 68 is matched to the groove 66b on the periphery of the collet chuck when the adapter 60 is carrying the tool or is located in the tool storage magazine.

That is, when the adapter 60 is inserted into the spindle, the ball 68 is required to slide freely inside the hole on the end portion of the adapter until the said ball 68 reaches the groove 11d in the spindle. When the adapter 60 is fully inserted into the spindle tool seat 11a and the collet chuck 66 is pulled by the collet at the outer end of the clamping rod through the pull stud 62 as illustrated in FIG. 5(A), the ball 68 moves from the groove 66b of the collet to the groove 11d of the spindle to retain the adapter 60 in the spindle. When the tool changer grasps the adapter 60 and removes it from the spindle, the collet chuck is pushed out against the force of the spring 69 by the outer end of the clamping rod 61. When the said ball 68 is matched to the peripheral groove 66b, the adapter can be removed.

At this time, the rod 73 springs into the positioning hole 66e under the force of the spring 72 and maintains the advance position of the collet against the reaction of the spring 69. With the parts in these positions, the adapter 60 is removed from the spindle, while holding the small-diameter tool. To remove the small-diameter tool from the adapter 60, the clamping rod 61 advances to the left from the position illustrated in FIG. 5(A), and the front end of the clamping rod 61 contacts the end surface of the pull stud 62 of the collet chuck 66. When the collet chuck advances slightly (i.e., to the extent to which the groove 66b on the periphery of the collet is not matched to the ball 68 in the adapter 60), the collet chuck 66 is loosened and the straight shank 112 of the small-diameter tool can be removed. However, the adapter 60 remains in position since the ball 68 is meshed with the groove 11d in the spindle. As described above, the advance of the clamping rod 61 differs depending on whether the adapter 60 and a national taper shank such as a large-diameter tool or a small-diameter tool with a straight shank is to be removed from the tool spindle 11. Therefore, the piston rod 75 of the tool release cylinder 74 mounted at the rear of the spindle head 10 must provide for two different types of advancing movement of the clamping rod. To meet this requirement, the guideway 75A at the front of the piston rod 75 is provided with an insert block 76 having two insert portions with different dimensions in the direction toward clamping rod 61. The amount of forward movement of the clamping rod 61 is controlled by selective indexing of the insert block to either of two positions by the solenoid 78 mounted on the piston rod 75 by a support plate 77. When the tool inside the spindle has a large diameter, solenoid valve 78 operates to move insert block 76 to the position as shown in FIG. 5A and the longer part of insert block 76 is positioned opposite the end of rod 61. If the port 74a of the cylinder 74 is connected to the pump and the port 74b is connected to the reservoir, piston 75 advances to cause the rod 61 to push the pull stud 62 a larger distance, thereby releasing the large-diameter tool from the spindle. As will be described later in detail, the piston 75 of the said tool releasing cylinder 74 is operated under the control of the signal which is produced when the tool in the spindle is grasped by the tool change arm 17 of the tool changer 13. The signal given by the limit switch (LS-16) is used to cause the tool change arm 17 to advance and remove the tool from the spindle. After the tool has been replaced by the 180° rotation of the tool change arm, the tool change arm 17 is withdrawn again. The completion signal produced at the end of the withdrawal of the tool change arm 17 is used to cause the piston 75 of the cylinder 74 to withdraw and the tool is clamped by the operation of the clamping rod 61. A clamping completion signal is produced by the limit switch (LS-17) and controls the holding operation of the tool change arm 17 to release it and restart the machining operation.

Figure 6:
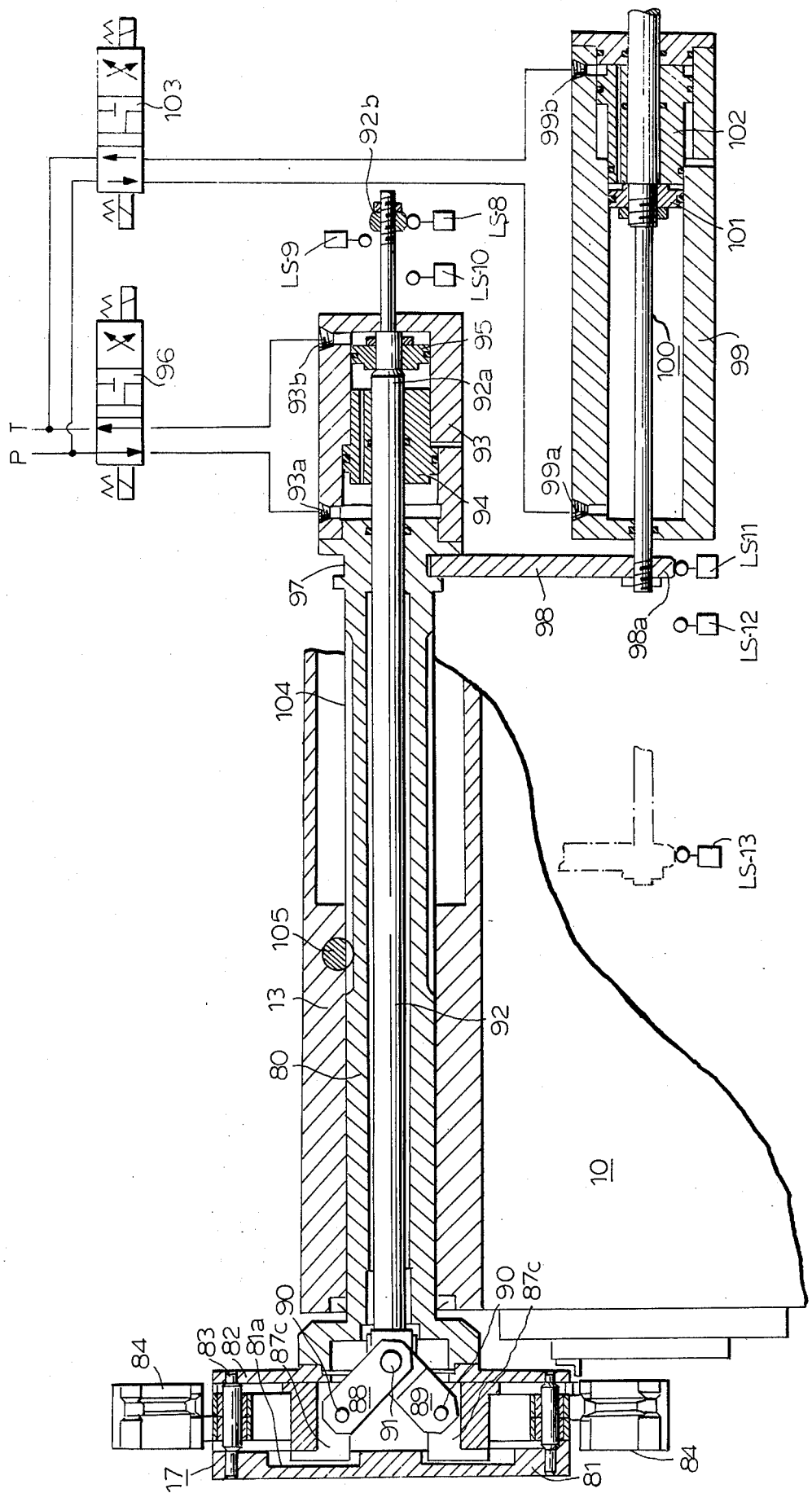
FIG. 6 is a longitudinal section showing the tool changer and taken along the line B-B in FIG. 9.
Figure 9:
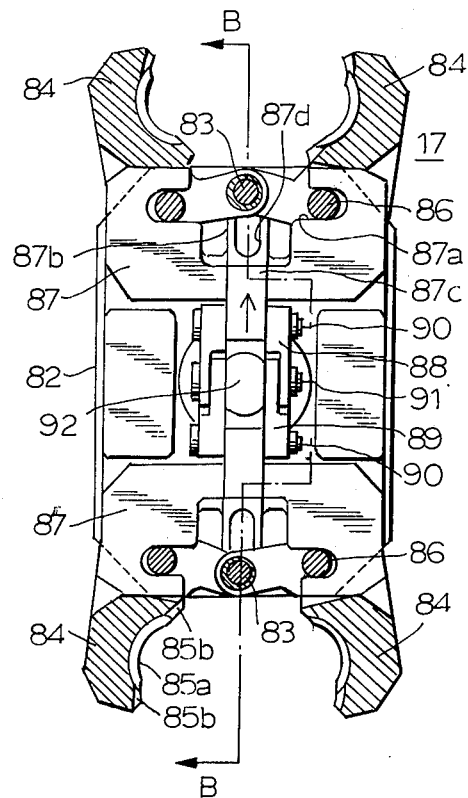
FIG. 9 is a longitudinal section showing the tool change arm.

As illustrated in FIG. 6 and FIG. 9, a rotatable center shaft 80 which is freely rotatable around its own axis and movable in a direction parallel to the spindle centerline mounted within the tool changer 13. The tool change arm 17 is mounted on the outer end of the said center shaft 80 which projects to the front of the tool changer 13. The outer casing of the said tool change arm 17 is composed of a front retainer plate 81 and a rear retainer plate 82. A swivel center pin 83 is mounted at both ends of the plates 81 and 82. Each of the pins 83 is provided with a pair of tool holding jaws 84 pivotable on said pins 83 for opening and closing. The tool holding jaws 84 are composed of a small-diameter tool holding section 85a and a large-diameter tool holding section 85b. Each tool holding jaw 84 is provided with a pin 86 at a position spaced from the holding portion. Each said pin 86 is meshed with a hook 87a at the tip end of a fork 87 held between the retainer plates 81 and 82 for opening and closing the corresponding tool holding jaw 84. The plates 81 and 82 guide the movement of the said forks 87 in the direction transverse to shaft 80 between the plates and the forks 87 are guided accurately in their sliding movement in the radial direction of the tool change arm by the front ends of the link mounting sections 87c of the forks 87 sliding in guide grooves 81a provided in the back of the front retainer plate 81. The outer ends of the forks 87 are provided with projecting portions 87b having recesses 87d therebetween which accommodates the center pins 83 during radial movement of the forks 87.

The projecting portions 87b are meshed with the key grooves of the tool when the holding jaws 87 are holding the tool, in order to prevent it from rotating inside the holding jaws while the tool change arm 17 is rotating. Links 88 and 89 each have one end pivotally mounted on the link mounting sections 87c of the respective forks 87 by the pins 90. The other ends of the links 88 and 89 are mounted, by pins 91, on the tips of a reciprocating drive shaft 92 which moves within the center shaft 80 in the axial direction thereof. A three position cylinder 93 is mounted at the rear end of the said swivel center shaft 80. The inside of the said cylinder 93 is provided with a piston 94 sliding on the piston rod 92a on the rear end of the reciprocating drive shaft 92 and a piston 95 fixed on the piston rod 92a. The holding jaws 84 are controlled so as to move to one of three positions by the said reciprocating drive shaft 92, links 88 and 89 and forks 87 by selecting the hydraulic pressure supplied into the ports 93a and 93b. These three positions correspond to the conditions in which the jaws are opened, in which the large-diameter tool has been grasped and in which the small-diameter tool has been grasped. That is, when the reciprocating drive shaft 92 is moved to the rightmost position by connecting the port 93a to the pump and the port 93b to the hydraulic fluid reservoir through the selection of the position of a solenoid valve 96, the tool holding jaws 84 are opened as illustrated in FIG. 9.

Figure 7:
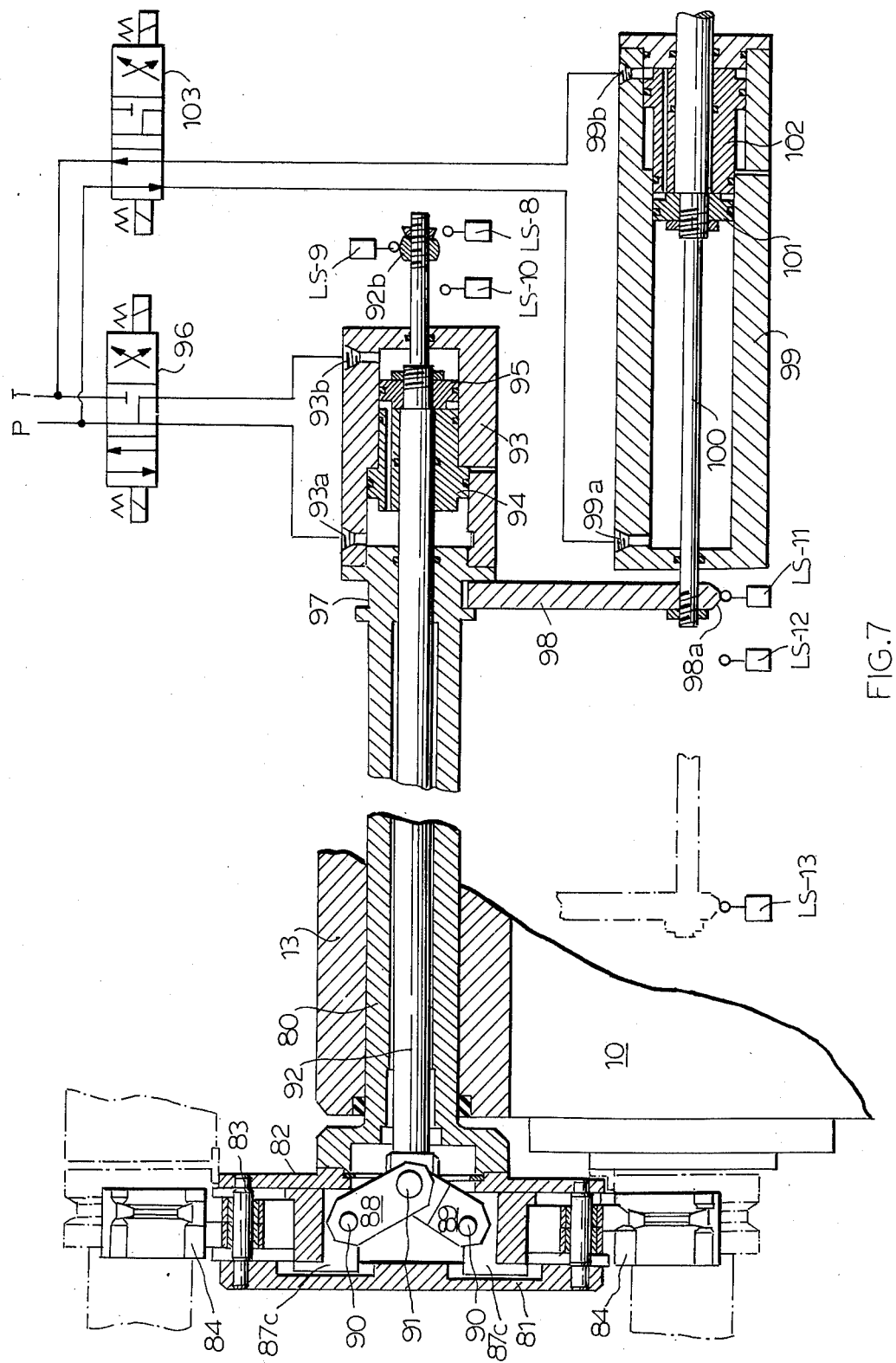
FIGS. 7 and 8 are partial sectional views illustrating the tool changing operation of the tool changer.
Figure 8:
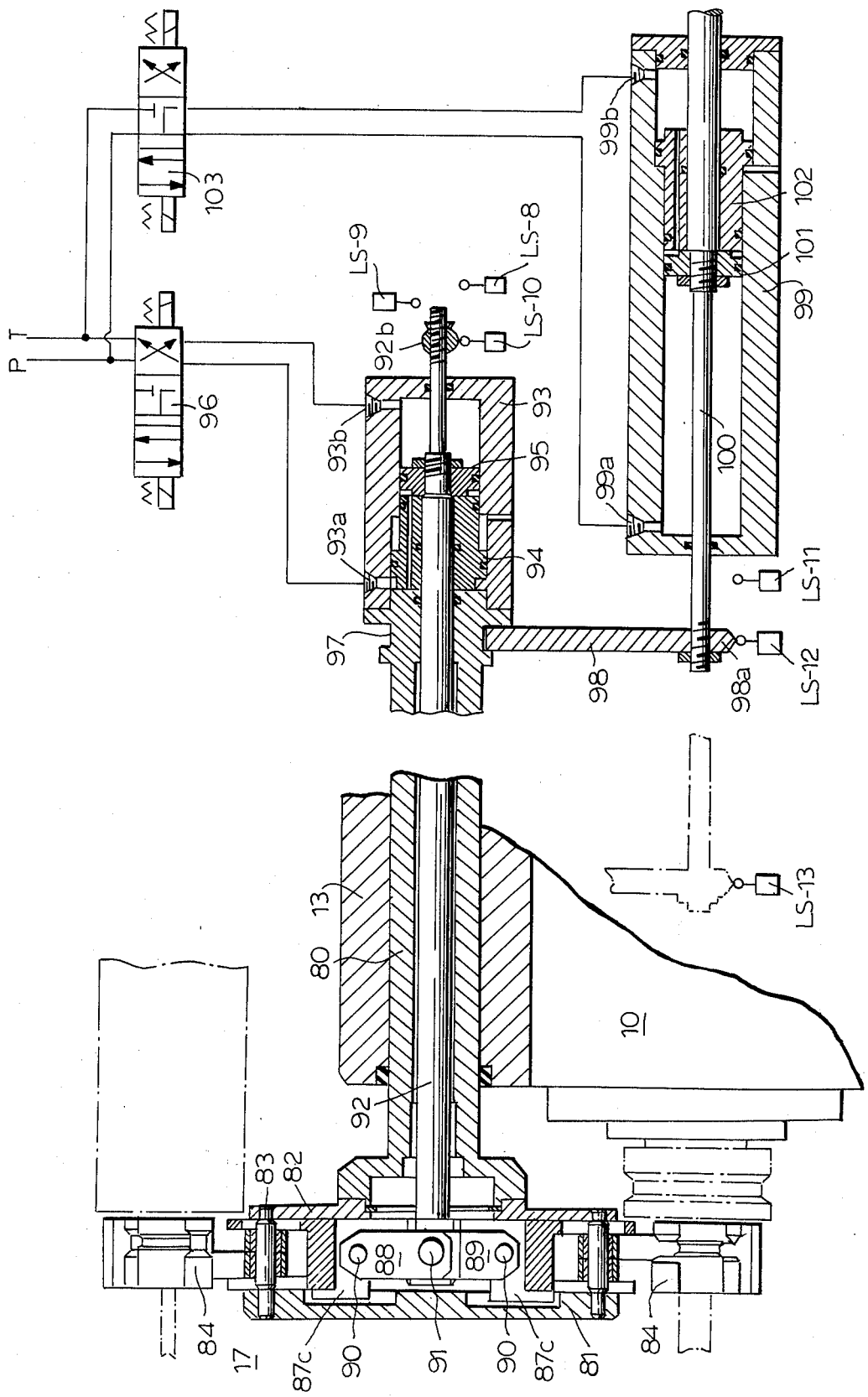
Figure 10:
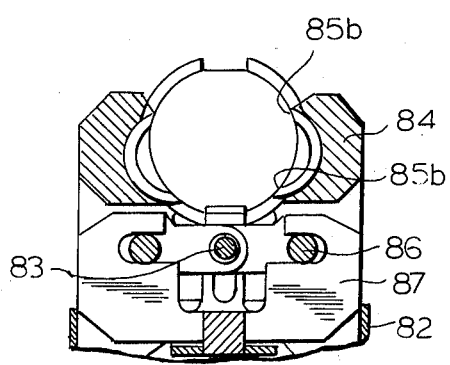
FIG. 10 is a longitudinal section showing a large-diameter tool held by the tool change arm.
Figure 11:
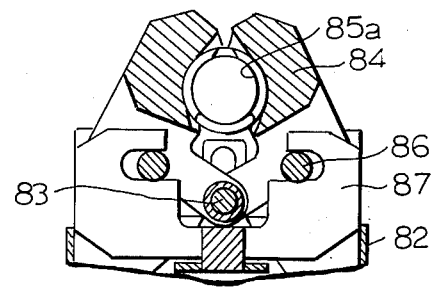
FIG. 11 is a longitudinal section showing a small-diameter tool held by the tool change arm.

This operation is confirmed by a signal produced when the limit switch (LS-8) has been actuated by the dog 92b on the rear of the piston rod 92a. When the ports 93a and 93b are connected to the pump by operation of the solenoid valve 96 to shut off the flow to the reservoir (as illustrated in FIG. 7), the reciprocating drive shaft 92 moves leftward to the neutral position and the tool holding jaws 84 are moved to positions to hold a large-diameter tool as illustrated in FIG. 10. This operation is confirmed by the signal produced when the limit switch (LS-9) is actuated by the dog 92B. As illustrated in FIG. 8, if the port 93b is connected to the pump and the port 93a is connected to the reservoir through operation of the solenoid valve 96 so as to move the reciprocating shaft 92 the leftmost position, the tool holding jaws 84 are closed to the maximum to permit holding of the small-diameter tool, as illustrated in FIG. 11. This operation is confirmed by the signal produced when the limit switch (LS-10) is actuated by the dog 92b.

The following describes the mechanism by which the tool change arm 17 is rotated 180° and the tool is moved in and out of the spindle or a tool socket 15.

As shown in FIG. 6, the rear portion of the center shaft 80 is provided with a circular groove 97 and a connecting plate 98 has a fork thereon engaging in the said circular groove 97.

The lower end of the connecting plate 98 has attached thereto a piston rod 100 extending into a tool change arm cross feed cylinder 99. The said cylinder 99 is divided into three chambers by means of a piston 101 fixed on the piston rod 100 and a piston 102 sliding on the piston rod 100. When a solenoid valve 103 is positioned to provide selective control of the hydraulic pressure to the ports 99a and 99b, the center shaft 80 can be positioned in three positions by the connecting plate 98 and the piston rod 100. As already described in the description of the adapter 60, these three positions are for holding a large-diameter tool, a small-diameter tool and to move the tool out of the tool socket. This is because the flange holding section of the large-diameter tool (such as a fullback cutter and adapter) is different from that of the small-diameter tool (such as a drill, tap and a reamer) in the axial direction of the center shaft 80.

That is, as shown in FIG. 6, when the port 99a is connected to the pump and the port 99b is connected to the reservoir by operation of the solenoid valve 103 and the center shaft 80 is brought to the rightmost position, the holding jaws 84 are in position to hold a large-diameter tool in the spindle or a tool socket. This operation is confirmed by a signal produced when the limit switch (LS-11) is actuated by the dog 98a. As shown in FIG. 8, when the ports 99a and 99b are connected to the pump by the operation of the solenoid valve 103 to shut off the channel to the reservoir, the piston 101 is controlled by the pressure difference and is brought to the neutral position. That is, when the center shaft 80 is moved leftward to the neutral position, and the tool holding jaws 84 are in position to hold a small-diameter tool in the spindle or tool socket. This operation is confirmed by a signal produced when the limit switch (LS-12) is actuated by the dog 98A. When the port 99b is connected to the tank by the operation of the solenoid valve 103, the center shaft 80 is brought to the leftmost position, and the tool holding jaws 84 which have been holding the tool in the spindle or a tool socket complete the operation of removing the tool from the spindle or tool socket. This operation is confirmed by the signal produced when the limit switch (LS-13) is actuated by the dog 98a. As shown in FIG. 6, the periphery of the central portion of the center shaft 80 is provided with a pinion 104 which is elongated in the axial direction of the center shaft (i.e., slightly longer than the maximum piston stroke of the cylinder 99). A rack 105 meshes with the said pinion 104 traversely of the said center shaft 80 and can slide freely within the tool changer 13. The rack is moved by a cylinder (not illustrated) for a distance required to rotate the tool change arm 17 180°.

Thus, the automatic tool changer according to this invention replaces one large-diameter tool with another large-diameter tool (or a large-diameter tool with an adapter) or one small-diameter tool with another small-diameter tool. However, this device cannot change the tools in other combinations, e.g., a small-diameter tool for a large-diameter tool. The following describes the cycles of operation for carrying out a tool change.

Assume that the tool on the spindle is cutting a workpiece and the tool holding jaws 84 are open and waiting for the next instructions and the tool has been inserted into the spindle in the previous tool change operation. That is, the jaws are open and waiting around the periphery of the flange section of the tool carried by the spindle. When the machining operation has been completed, the signal indicating the completion of the operation causes the apparatus to operate to tilt the tool transfer device 36 to tilt the tool at the tool change ready position (C) and to bring it to the tool change position. This operation is confirmed by the signal produced when the limit switch (LS-7) is actuated by the dog 47. This signal is used to cause the solenoid valve 96 for cylinder 93 to operate the piston 95 to close the tool holding jaws 84. Then the tool holding jaws 84 hold the tools in both the spindle and the tool socket. For example, when both tools are large-diameter tools, the piston 95 is advanced until the limit switch (LS-9) is depressed by the dog 92b. If both tools are small-diameter tools, the piston 95 is advanced until the limit switch (LS-10) is operated by the dog 92b, thereby holding the tools. This operation is confirmed by the signal produced when the limit switch (LS-9 or LS-10) has been actuated. This signal also serves to cause the piston 75 of the cylinder 74 to operate for releasing the tool from the spindle. The clamping rod 61 then advances to release the tool.

Prior to this operation, in cases where the large-diameter tools are used in the spindle and tool socket, the longer portion of the insert block 76 of the piston rod 75 is properly positioned by the operation of the solenoid 78. In cases where the small-diameter tools are used in the spindle and tool socket, the shorter insert block 76 is properly positioned by the operation of the solenoid 78. In cases where the small-diameter tools are used in the spindle and tool socket, the shorter insert block 76 is properly positioned by the spring force accompanying the demagnetization of the solenoid 78. In both cases, a signal is produced by the operation of the limit switch (LS-16), indicating the completion of the tool release operation.

This signal is used to change over the solenoid valve 103 for the cylinder 99 for producing axial movement of the tool change arm 17 by moving the piston 101. Then the tools are removed from the spindle and the tool socket at the same time. A signal indicating this is produced by the operation of the limit switch (LS-13). The cylinder for the rack 105 is operated in response to this signal and the tool change arm 17 is rotated 180°. When the signal is produced to indicate completion of this rotation, the solenoid valve 103 is again operated to retract the piston 101 to a position appropriate for the old and new tools. For example, if the small-diameter tools are used in the spindle and tool socket, the piston 101 is retracted until the limit switch (LS-12) is actuated by the dog 98a. On the other hand, if the large-diameter tools are used in the spindle and tool socket, the piston 101 is retracted until the limit switch (LS-11) is actuated by the dog 98a. The retraction of the piston is confirmed by the signal which is confirmed by the signal which is emitted by either of these two limit switches. This signal is used to operate the piston 75 of the tool release cylinder 74 and the piston 75 is retracted to the rearmost position.

As a result, the clamping rod 61 is retracted by the reactionary force of the belleville spring 65 and the collet chuck for the pull stud 62 at the outer end of the said clamping rod pulls in the pull stud 62 of the large-diameter tool or the pull stud 62 of the small-diameter tool holding collet 66 of the adapter 60. The tool is thus held securely in the spindle. The retraction of the piston 75 is confirmed by the signal emitted by the operation of the limit switch (LS-17). This signal is used to operate the solenoid valve 96 of the tool holding jaw cylinder 93 to move the piston 95 to the rearmost position. Then the tool holding jaws 84 open. The signal indicating this action is produced by the operation of the limit switch (LS-8). The machining operation is also restarted in response to this signal.

The used tool inserted in the tool socket 15 is returned, together with the tool socket, to the original address in the tool storage magazine. The tool storage magazine calls up the next tool to be used and the called tool is transferred, together with the tool socket therefor, to the tool change ready position (C) by the tool transfer device 36 where the tool waits for the next instruction. As described above, the movement of each mechanism and position for confirmation vary depending on whether the large- or small-diameter tool is to be changed. Therefore, when the machining procedure is taken into consideration, the usual way is to change between the large-diameter tools, then between a large-diameter tool and an adapter and finally between a small-diameter tool in an adapter and another small-diameter tool. In any case, changes between the small-diameter and large-diameter tools should be made after changing the adapters.

Figure 12A:
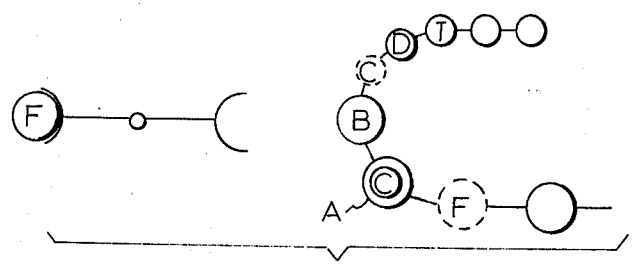
FIGS. 12(A) through (S) illustrate the relationship between the tool change operation and tool indexing operation of the tool storage magazine.
Figure 12B:
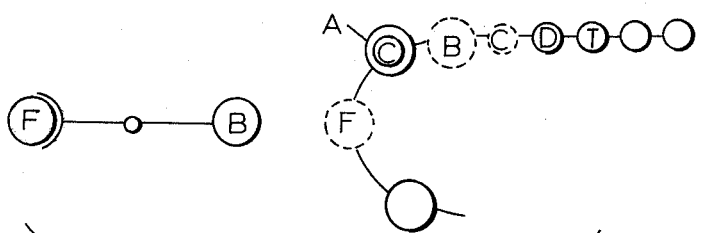
Figure 12C:
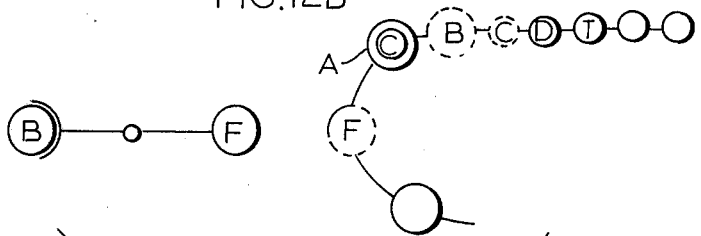
Figure 12D:
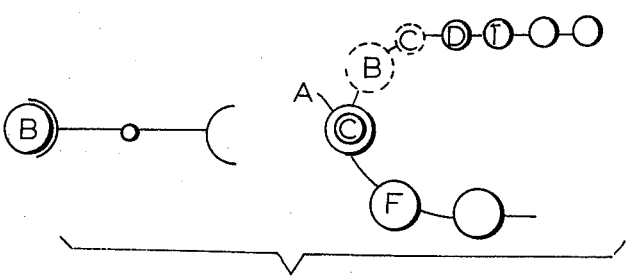
Figure 12E:
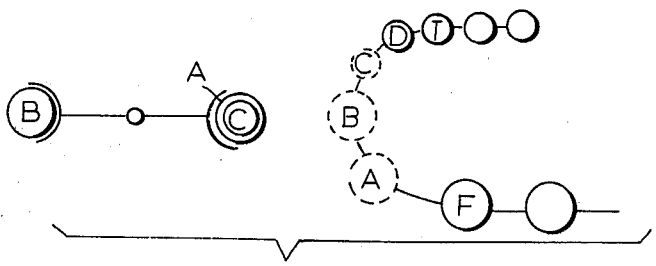
Figure 12F:
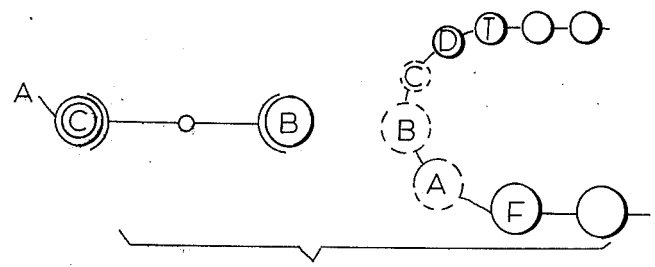
Figure 12G:
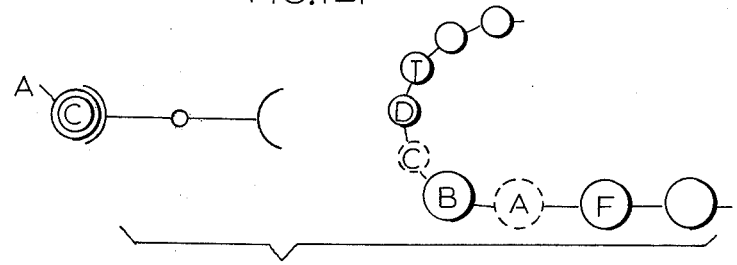
Figure 12H:
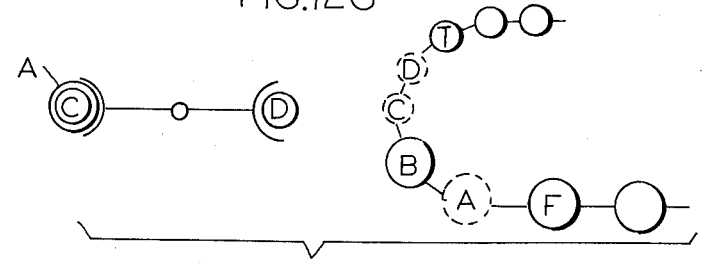
Figure 12I:
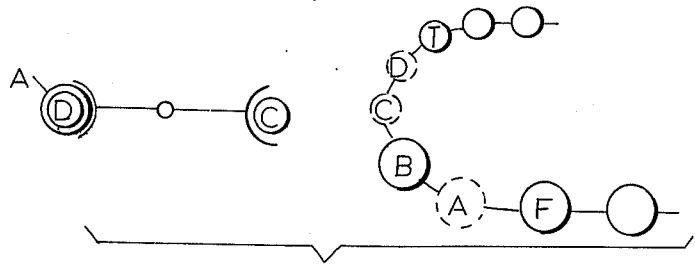
Figure 12J:
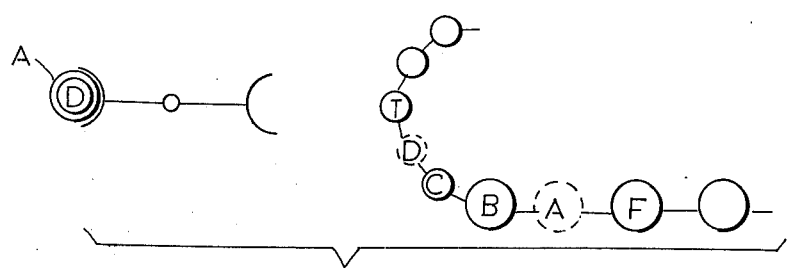
Figure 12K:
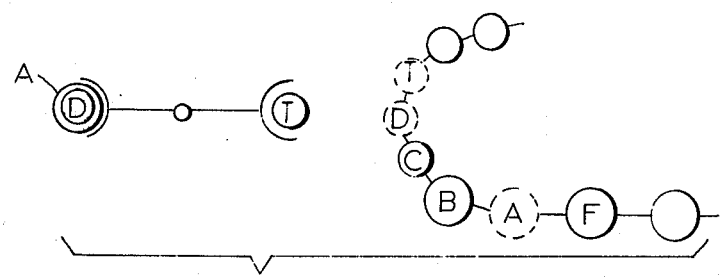
Figure 12L:
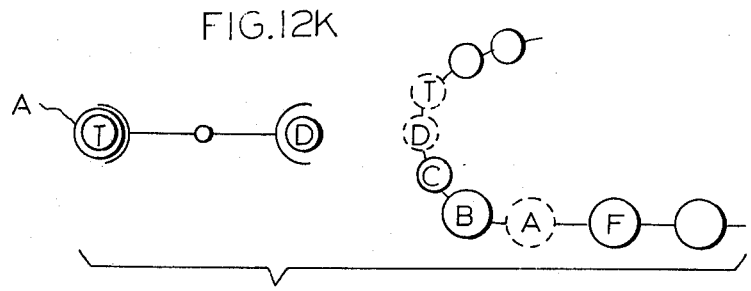
Figure 12M:
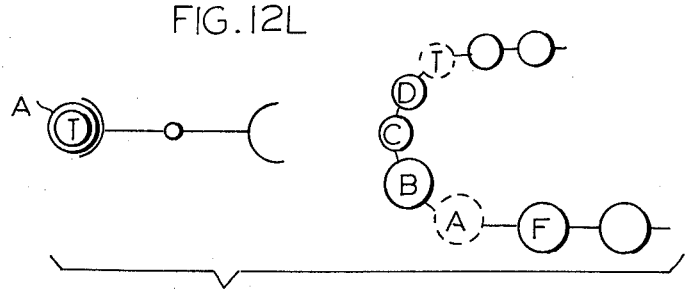
Figure 12N:
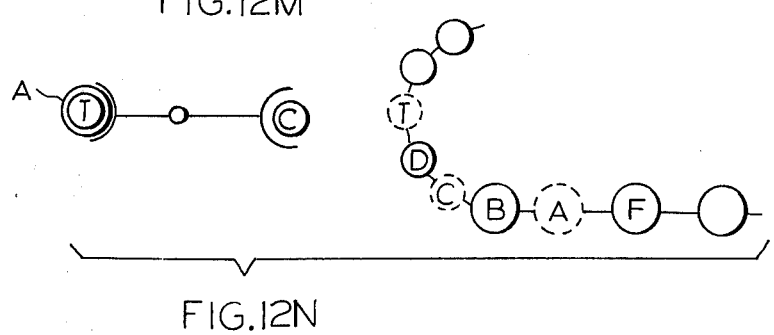
Figure 12O:
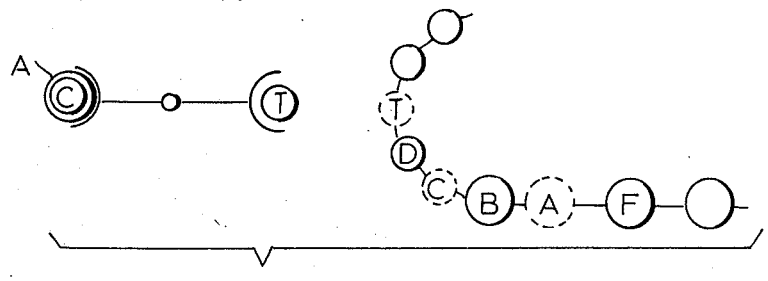
Figure 12P:
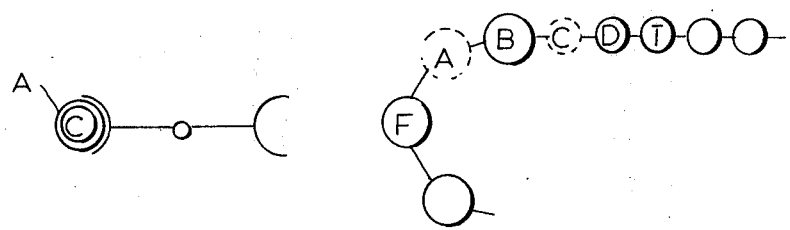
Figure 12Q:
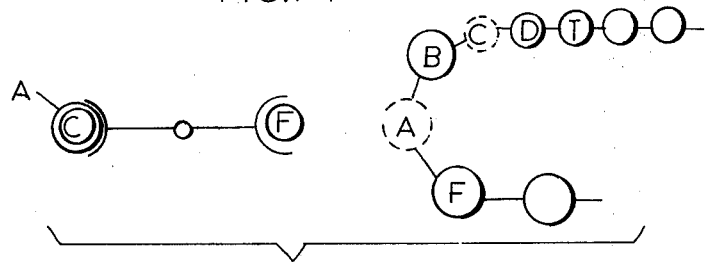
Figure 12R:
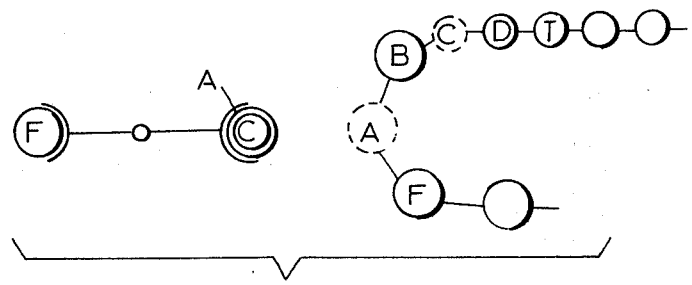
Figure 12S:
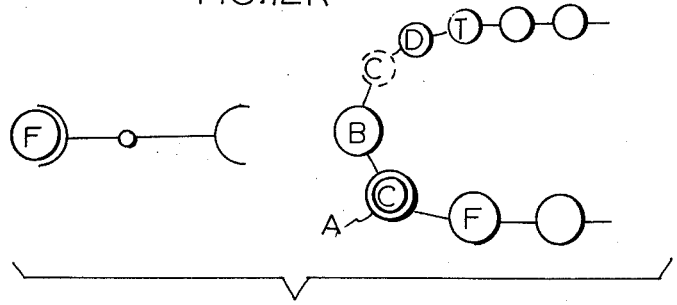

The following describes the manner in which a large-diameter tool, an adapter and a small-diameter tool are replaced in accordance with the procedure shown in FIGS. 12(A) through (S).

FIG. 12(A) shows a condition in which a tool F, the first tool in the machining cycle, has been taken from the tool storage magazine and been inserted into the spindle. If the workpiece is mounted on the table and the machine starts operations, the tool F in the spindle starts cutting of the workpiece. During the cutting operation, the chain 21 moves along its path in order to search for the next tool B in the tool storage magazine. As illustrated in FIG. 12(A), the tool B is indexed to the tool call position of the tool storage magazine by means of the tool identifier device 28 and chain indexing device. The tool B indexed to the tool call position is transferred to the tool change ready position by the tool transfer device 36, where it waits for the next instructions. Then the tool storage magazine calls the address (15F in FIG. 4) where the tool F which is being used for machining is to be stored, as illustrated in FIG. 12(B). When the machining by tool F has been completed and tool F has been removed from the workpiece the specified distance to replace the tools, a signal is given to indicate the completion of this operation. This signal tilts the tool B to the tool change position parallel to the spindle centerline.

Since both the called tool B and used tool F are large-diameter tools, the tool change arm performs the operation required for the large-diameter tools and grasps these tools. After receiving the signal indicating the completion of grasping, the tool releasing device releases the tool clamped in the spindle. Then the tool change arm advances and pulls out both tools. It swivels 180° as illustrated in FIG. 12(C) and inserts the tool B into the spindle in the way appropriate for the large-diameter tool. The tool B is clamped in the spindle and the machining operation is started in response to the signal confirming that the tool holding jaws of the tool change arm have opened. While the tool B is cutting a workpiece, the used tool F stored in the tool socket in the tool change position is returned to its address in the tool storage magazine together with the socket. Then the tool storage magazine is actuated to bring the tool C to be used after the tool B into the tool call position, as illustrated in FIG. 12(D). Tool C is a small-diameter tool held in adapter A. Since it is located inside an adapter, the tool B will be replaced by adapter A. The called tool C is transferred to the tool change ready position (C) by means of the tool transfer device 36, where it waits for the next instruction. Then the tool storage magazine is actuated to bring the storage position of the tool B being used to the tool call position, as illustrated in FIG. 12(E). When the machining by tool B has been completed and the tool B is transferred away from the workpiece the specified distance preparatory to changing the tools, a signal is issued to indicate the completion of these operations. As a result of this signal, the adapter A holding the tool C is tilted to the tool change position. The adapter A carrying the called tool C and the used tool B are large-diameter tools. So the tool change arm performs an operation appropriate for large-diameter tools. It grasps these tools and draws them out after the instruction to release the tool clamped in the spindle by means of the tool release device. Then, as illustrated in FIG. 12(F), the tool change arm rotates 180° and inserts the tool C and adapter A into the spindle and tool B into the tool socket in the manner appropriate for the large-diameter tools. The spindle clamps the tool C and adapter A as one piece. When a signal is given to indicate that the tool change arm holding jaws have opened, the machine starts the machining operation. While the tool C is cutting the workpiece, the used tool B stored in the tool socket at the tool change position is returned by the tool transfer device 36 together with the socket, to its storage position in the magazine. As shown in FIG. 12(G), the tool storage magazine moves the tool D which is to be used after tool C to the tool call position. Both tools C and D are small-diameter tools. The called tool D is transferred to the tool change ready position (C) by the tool transfer device 36, where it waits for the next instruction.

As illustrated in FIG. 12(H), the tool storage magazine moves the storage position (15D in FIG. 4) where the tool C being used is to be stored to the tool call position.

When machining by tool C has been completed and the tool C is transferred away from the workpiece to change the tool, a signal is issued to indicate the completion of the operation. As a result of this signal, the tool D is tilted to the tool change position. The called tool D and used tool C are small-diameter tools. So the tool change arm grasps these tools in the manner proper for small-diameter tools, and draws tool C out of the adapter (A) and tool D from the tool socket, the tool C having been released from the adapter A in the spindle by a spindle tool clamp release instruction supplied to the tool release device. As shown in FIG. 12(I), the tool change arm rotates 180° and inserts the tool D into the adapter A in the spindle and tool C into the tool socket in a manner appropriate for small-diameter tools. The spindle clamps the tool D into the adapter A. In response to the signal indicating that the tool holding jaws of the tool change arm have been opened, the machine starts the machining operation.

While the tool D is cutting the workpiece, used tool C stored in the tool socket at the tool change position is returned, together with the socket, to a temporary storage position for a small-diameter tool which has already been moved to the tool call position, by means of the tool transfer device 36. As shown in FIG. 12(J), the magazine moves the final tool T which is to be used after tool D to the tool call position. Tool T is a small-diameter tool, the same as the tool D being used. The called tool T is transferred to the tool change ready position (C) by the tool transfer device 36, where it waits for the next instruction. As shown in FIG. 12(D), the magazine moves the tool storage position for the tool D being used to the tool call position. When the machining by tool D has been finished and the tool D is moved away from the workpiece a specified distance for tool change, a signal is produced to indicate the completion of this operation and the tool T is tilted to the tool change position. Since both the called and used tools are small-diameter tools, the tool change arm grasps them in a manner appropriate for small-diameter tools, the tool change arm grasps them in a manner appropriate for small-diameter tools. It draws the tool D out of the adapter A and the tool T from the tool socket in response to the signal indicating release of the tool clamped in the adapter in the spindle. As shown in FIG. 12(L), the tool change arm rotates 180° and inserts the tool T into the adapter inside the spindle and the tool D into the tool socket. The spindle clamps the tool T into the adapter. When the machine receives the signal confirming that the tool holding jaws of the tool change arm have been opened, it starts the machining operation.

While the tool T is cutting the workpiece, the used tool D stored in the tool socket at the tool change position is returned, together with the socket, to the storage position already moved to the tool call position, by means of the tool transfer device. Since the tool T is the final cutting tool, there is no tool to be called for the next operation in this cycle. However, the machine continues to operate to arrange the tools in the original order, ready for use in the next cycle. That is, the first job is to pair off the adapter and tool C and to return them to the proper tool storage position for tool C with the tool C inserted in the adapter A. The second job is to move the tool F back into the spindle. For the first job, the tool storage magazine moves tool C to the tool call position following the return of the tool D to its storage position, as illustrated in FIG. 12(M).

The called tool C is transferred to the tool change ready position by the tool transfer device, where it waits for the next instruction.

The tool storage magazine moves the storage position for the tool T being used to the tool call position, as depicted in FIG. 12(N). When the tool T has completed the cutting and is removed from the workpiece the specified distance for tool change, a signal is given to indicate completion of this operation. In response to this signal, the tool C tilts to the tool change position. Since both the called tool and the tool C are small-diameter tools, the tool change arm grasps them in the manner appropriate for small-diameter tools and removes the tool T from the adapter and the tool C from the tool socket in response to the signal indicating that the tool T has been released from the tool clamp in the spindle by means of the tool release device. As depicted in FIG. 12(O), the tool change arm rotates 180° and insert the tool C into the adapter A and the tool T into the tool socket in the manner appropriate for small-diameter tools. When the spindle clamps the tool C into the adapter A, a signal is produced to indicate that the tool holding jaws of the tool change arm have been opened. However, since there is no data informing the machining to continue the cutting operation, the machine stops at that position without performing machining. Concurrently, the used tool T stored in the tool socket at the tool change position is returned by the tool transfer device 36 together with the socket, to the storage location for tool T already moved to the tool call position. As shown in FIG. 12(P), the tool storage magazine then moves the first tool F to the tool call position. This tool is a large-diameter tool and the adapter A holding the tool C in the spindle is also a large-diameter tool. The called tool F is transferred to the tool change position by the tool transfer device where it waits for the next instruction.

The tool storage magazine moves the permanent tool storage location for tool C in the adapter A, now in the spindle, to the tool call position, as illustrated in FIG. 12(Q). When a signal is given to indicate that this operation is completed, the tool F tilts to the tool change position. The called tool F and adapter A in the spindle are both large-diameter tools. So the tool change arm grasps them in a manner appropriate for large-diameter tools and removes the adapter A from the spindle and the tool F from the tool socket in response to the signal indicating that the adapter A has been released from the spindle. As illustrated in FIG. 12(R), the tool change arm rotates 180° and inserts the tool F into the spindle and the adapter A into the tool socket. The spindle clamps the tool F and the tool holding jaws of the tool changer arm open. Concurrently, the adapter A holding the tool C is returned, together with the socket, to the storage position therefor. This completes the entire operation cycle.

The present invention permits use not only of the large-diameter tools but also the small-diameter tools in one machining center by use of an adapter which has the same shank configuration as that of the large-diameter tool and which holds the small-diameter tool. This feature has succeeded in increasing the number of tools which can be stored in the magazine.

In the description of the use of the present invention, a small-diameter tool with straight shank is inserted into the adapter having the national taper shank and the small-diameter tool is held in the adapter by the collet chuck 66.

It is also possible to provide a small-diameter tool with a shank having a national taper or Morse taper smaller than that of the large-diameter tool. This will permit the pull stud on the rear of the small-diameter tool to be held directly by the tip of the clamping rod and to be pulled into the adapter.

As stated above, the present invention is not confined to the examples illustrated in the present specification but may be modified within the scope of the technological concept set forth in the claims.

What is claimed is:

1. A machine tool comprising:
a tool storage magazine having a plurality of first tool storing means with recesses therein with a shape corresponding to a first tool shank configuration for holding tools having a first shank configuration, a plurality of second tool storing means with recesses therein with a shape corresponding to a second tool shank configuration which is larger than the first tool shank configuration, at least one tool adapter having an exterior shape corresponding to the second tool shank configuration and positioned in at least one of said second tool storing means and further having a recess therein with a shape corresponding to the first tool shank configuration, whereby small tools having a first tool shank configuration can be stored in said first tool storing means and in said adapters in said second tool storing means, and large tools having a second tool shank configuration can be stored in said second tool storing means;

a tool spindle with a tool seat in a forward end thereof projecting out of the machine tool, said tool seat having a recess therein corresponding to the second tool shank configuration, a tool clamping rod movable axially within said tool spindle and having a pull stud engaging means on the end of said clamping rod toward said tool seat for engaging a pull stud on the rear of the shank of the large tool when said clamping rod is retracted into said spindle and for permitting the pull stud to be disengaged from said clamping rod when said clamping rod is moved toward said tool seat a first distance, spring means urging said clamping rod in the retracting direction, each of said adapters having a shank holding means movable in the direction of retraction of said clamping rod for holding the shank of a small tool in the adapter and being movable axially toward the forward end of said spindle by movement of said clamping rod toward said tool seat a second distance less than said first distance for releasing the shank of the small tool without releasing said adapter from said tool seat;

an automatic tool changer comprising a rotatable center shaft parallel to said spindle, a tool change arm transversely mounted on the outer end of said center shaft, a pair of tool holding jaws mounted on the opposite ends of said tool change arm and movable from a fully open position to at least an intermediate position in which they can grasp a large tool and to a fully closed position in which they can grasp a small tool, a rotational drive means coupled to said rotatable center shaft for reciprocatably rotating said center shaft around the axis of said center shaft from a position where the jaws on one end of said tool change arm can grasp a tool in the spindle to a position where the jaws on the other end of said tool change arm can grasp a tool in said spindle, an axial drive means coupled to said center shaft for driving said center shaft axially, and jaw driving means coupled to said jaws for driving said jaws to close said jaws to said intermediate or fully closed positions depending on the size of the tool to be grasped and to return the jaws to the fully open position; and means for engaging a tool storing means and reciprocally carrying it from said tool storage magazine to a position at which the jaws on the other end of said tool change arm can grip a tool in the tool storing means.

2. In a machine tool having an automatic tool changer, a tool storage magazine comprising a plurality of first tool storing sockets with recesses therein having a shape corresponding to a first tool shank configuration for directly holding tools having a first shank configuration, a plurality of second tool storing sockets with recesses therein having a shape corresponding to a second tool shank configuration which is larger than the first tool shank configuration, at least one tool adapter having an exterior shape corresponding to the second tool shank configuration and positioned in at least one of said second tool storing sockets and further having a recess therein with a shape corresponding to the first tool shank configuration and in which small tools having a shank with a first tool shank configuration can be stored, whereby small tools can be stored directly in said first tool storing sockets and further said small tools can be stored in said adapters in said second tool storing sockets, and large tools having a second tool shank configuration can be stored directly in said second tool storing means.

3. A tool storage magazine as claimed in claim 2 in which said first shank configuration is a straight shank configuration for small tools and said second shank configuration is a tapered configuration for large tools.

4. A tool spindle for a machine tool which has an automatic tool changer for supplying small and large tools to the tool spindle, the tool spindle comprising: a spindle member with a tool seat in one end thereof which projects out of the machine tool and which is the forward end of said spindle member, said tool seat having a tapered recess therein corresponding to the shape of a shank of a large tool, an adapter in said tool seat having an external shape the same as the shape of the shank of the large tool and having a shank holding means extending axially of the adapter with a collet for holding a shank of a small tool on the end thereof toward the forward end of said tool spindle and an adapter stud on the other end thereof, a tool clamping rod movable axially within said tool spindle and having a pull stud engaging means on the end thereof toward the forward end of said tool spindle for engaging a tool pull stud located on the rear of the shank of the large tool or for engaging the adapter pull stud when said clamping rod is moved along said spindle away from said forward end and for disengagement from the large tool shank pull stud or the adapter pull stud when said clamping rod is moved toward said tool seat a first distance, said collet being releasable from the shank of a small tool therein when said clamping rod is moved toward said tool seat a second distance which is smaller than said first distance, spring means urging said tool clamping rod in the direction away from the forward end of said tool spindle, a power source connected to said tool clamping rod for pushing said tool clamping rod axially against the force of said spring means, and a control device means operatively associated with said tool clamping rod and said power source for moving said tool clamping rod the first distance or the second distance by selective control of said power source for disengaging said pull stud engaging means of said tool clamping rod from the tool pull stud on the shank of a large tool or the adapter pull stud when said tool clamping rod is moved said first distance and releasing said collet from the shank of a small tool without releasing said adapter from said tool seat when said tool clamping rod is moved said second distance.

* * * * *